(12) United States Patent
Golias

(10) Patent No.: US 7,270,228 B2
(45) Date of Patent: Sep. 18, 2007

(54) HANGER FOR CONVEYOR ASSEMBLY

(75) Inventor: Robert J. Golias, Solon, OH (US)

(73) Assignee: Metal Fabricating Corporation, Cleveland, OH (US)

( * ) Notice: Subject to any disclaimer, the term of this patent is extended or adjusted under 35 U.S.C. 154(b) by 39 days.

(21) Appl. No.: 11/232,507

(22) Filed: Sep. 22, 2005

(65) Prior Publication Data

US 2006/0060451 A1   Mar. 23, 2006

Related U.S. Application Data

(60) Provisional application No. 60/611,922, filed on Sep. 22, 2004.

(51) Int. Cl.
 *B65G 17/32* (2006.01)
(52) U.S. Cl. ............... 198/465.4; 198/685; 198/687.1
(58) Field of Classification Search ............ 198/465.4, 198/685, 687.1
See application file for complete search history.

(56) References Cited

U.S. PATENT DOCUMENTS

| | | | | |
|---|---|---|---|---|
| 490,224 A | * | 1/1893 | Campbell | 294/5.5 |
| 2,385,588 A | * | 9/1945 | Schneider | 223/88 |
| 2,725,165 A | * | 11/1955 | Ohlerich | 223/98 |
| 4,344,363 A | * | 8/1982 | Veith | 104/162 |
| 4,527,484 A | * | 7/1985 | Veith et al. | 104/89 |
| 4,535,962 A | * | 8/1985 | Chan et al. | 248/214 |
| 4,979,712 A | * | 12/1990 | Rios | 248/215 |
| 5,018,694 A | * | 5/1991 | Olson | 248/340 |
| 5,050,833 A | * | 9/1991 | Usner | 248/340 |
| 5,664,659 A | * | 9/1997 | Gaertner | 198/360 |
| 5,769,949 A | * | 6/1998 | Cienkus et al. | 118/621 |
| 2004/0245073 A1 | * | 12/2004 | Hawk et al. | 198/678.1 |

* cited by examiner

*Primary Examiner*—Mark A. Deuble
(74) *Attorney, Agent, or Firm*—Fay Sharpe LLP

(57) ABSTRACT

A hanger for an overhead conveyor system has a member including spaced-apart-shaped portions generally along a first axis a distance that is generally equal to a distance between adjacent load pins of a conveyor chain or a whole number multiple of the distance between adjacent load pins of the conveyor chain. The member further has an angled portion disposed between the hook-shaped portions along a line that is generally parallel to the first axis and along a second axis that is generally perpendicular to the first axis. The member further includes a first arm interconnecting the first hook-shaped portion and the angled portion and a second arm interconnecting the second hook-shaped portion and the angled portion.

20 Claims, 3 Drawing Sheets

HANGER FOR CONVEYOR ASSEMBLY

This application claims the benefit of provisional Patent Application Ser. No. 60/611,922, filed Sep. 22, 2004, the entirety of which is incorporated by reference.

BACKGROUND OF THE INVENTION

Overhead conveyor systems are used in many manufacturing facilities. These overhead conveyor systems are typically used to move items, such as items made out of metal, through different manufacturing stages including heating the item in an oven, washing the item in a washing station or painting the item at a painting station. With reference to FIG. 1, a known clevis pendant 10 can be used to hang an item from a conveyor chain 12 which makes up a portion of the known conveyor system. The known clevis pendant includes a first flat bar 14 pivotally attached to a second flat bar 16 at a rivet 18 such that the pendant has a scissor-like configuration. The first bar 14 includes a hook 22 that cooperates with a hook 24 on the second plate 16 to engage a load pin 26 in a vertical link 28 of the chain 12. When the first bar 14 and the second bar 16 are brought together such that each bar is in a vertical configuration, a cotter pin 32 can be inserted through a first opening 34 in the first bar and a corresponding second opening 36 in the second bar such that the pendant 10 is in a locked configuration. As more clearly seen in FIG. 2, a lower portion 38 of the first plate 14 and a lower portion 40 of the second plate 16 can be angled outward so that the pendant 10 can receive a bar or similar item to attach to a lower end of the pendant.

Referring again to FIG. 1, one example of an item that attaches to the known pendant 10 is known as a T-shaped bar or a "T-bar" 42. The T-bar includes first and second vertical members 44, 46 spaced from each other where the first member 44 includes an opening or aperture 48 and the second member includes an opening or aperture 52. Each of these openings 48 and 52 aligns with openings 34 and 36 in the pendant 10 to receive the cotter pin 32 to attach the bar 42 to a respective pendant 10. Two pendants are needed to attach the T-bar 42 to the conveyor chain 12. The T-bar 42 also includes a horizontal bar 54 that is integral with the vertical members 44 and 46. Items such as cabinets and other items can be hung from the T-bar 42 by hooks, wires or cables that hook or loop around the horizontal member 54 of the T-bar.

The known clevis pendant can be difficult to remove from an overhead conveyor chain especially where the pendant travels through a painting operation because overspray from the paint is deposited on the pendant causing buildup of paint on the pendant thus making removal of the cotter pin difficult. Accordingly, much downtime is needed to clean and replace the pendants and T-bars and this time could be used more productively. Also, the cotter pin can wear out and the clevis pendant can be difficult to move in a scissor-like manner. Furthermore, this could cause failure of the pendant and result in damage to the products hung from the T-bar or also cause possible injuries to users of the conveyor system.

SUMMARY OF THE INVENTION

A hanger for an overhead conveyor system includes a member having a first hook-shaped portion and a second hook-shaped portion spaced from the first hook-shaped portion generally along a first axis a distance that is generally equal to a distance between adjacent load pins of an associated conveyor chain. The first hook-shaped portion can be spaced from the second hook-shaped portion a whole number multiple of the distance between adjacent load pins of the associated conveyor chain. The member further includes an angled portion disposed between the first hook-shaped portion and the second hook-shaped portion. The angled portion being spaced from the first hook-shaped portion and the second hook-shaped portion along a line that is generally parallel to the first axis and along a second axis that is generally perpendicular to the first axis. The member further includes a first arm interconnecting the first hook-shaped portion and the angled portion and a second arm interconnecting the second hook-shaped portion and the angled portion.

A hanger assembly for an overhead conveyor system includes a generally V-shaped member adapted to attach to an associated overhead conveyor chain and a load bar connected to the member. The generally V-shaped member includes a first hook-shaped portion adjacent a first end of the member, a second hook-shaped portion adjacent a second end of the member, and a lower curved portion disposed between the first end and the second end. The second hook-shaped portion being spaced from the first hook-shaped portion generally along a first axis a distance that is generally equal to a distance between adjacent load pins, or a whole number multiple thereof, of the associated conveyor chain. The load bar is adapted to allow associate items that are to be transported by the associated conveyor chain to hang from the load bar.

A hanger for an overhead conveyor includes a generally V-shaped member adapted to attach to an associated overhead conveyor chain. The member includes a first portion, a first arm, a second portion, a second arm, a first upper curved portion interposed between the first end portion and the first arm, a lower curved portion interposed between the first arm and the second arm and a second upper curved portion interposed between the second arm and the second end portion. The member is configured such that the first curved portion and the second curved portion are concave toward the lower curved portion. The member is also configured such that the lower curved portion is concave toward the upper curved portions.

DETAILED DESCRIPTION OF THE INVENTION

Figure 3:
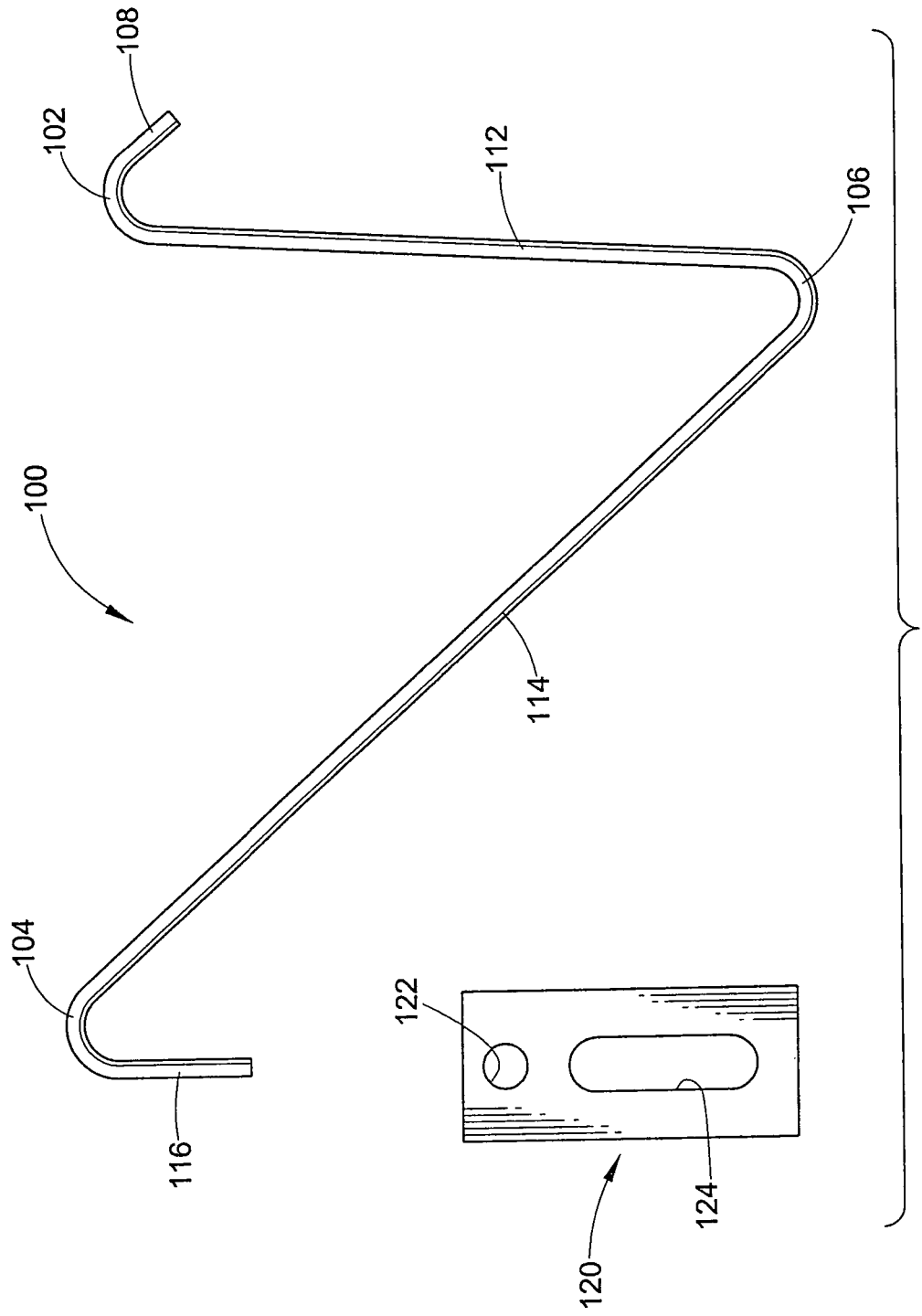
FIG. 3 is a side elevational view of an angled portion and a bar of a hanger assembly according to a preferred embodiment of the present invention.

With reference to FIG. 3, a hanger for an overhead conveyor system includes an angled member 100 having a first hook shaped portion 102 formed adjacent a first end of the hanger. A second hook shaped portion 104 is formed adjacent a second end of the hanger. The angled member 100 also includes an angled portion 106 that is spaced from and formed between portions 102 and 104. Portion 106 can be substantially V-shaped in configuration. Member 100 can be fabricated from stainless steel. Stainless steel, in addition to providing rigidity and durability to the hanger, allows the hanger to travel through an oven having temperatures in the 400-500° F. range while maintaining adequate tensile strength. Nevertheless, member 100 can be made from other suitable materials as well. Member 100 in this embodiment has a circular cross section; however, the member can have other cross sections including polygonal or square. Generally, first portion 102 is spaced from second portion 104 a distance that is approximately equal to the distance between two adjacent load pins of a conveyor chain to which the hanger will be attached. In alternative embodiments, the space between the first and second portions 102, 104 can be equal to a multiple of the distance between two adjacent load pins of a conveyor chain. The vertical distance between hook shaped portions 102, 104 and the angled portion 106 can vary to accommodate the difference in elevation between the conveyor belt and the articles to be transported desired by the end user of the hanger.

Figure 1:
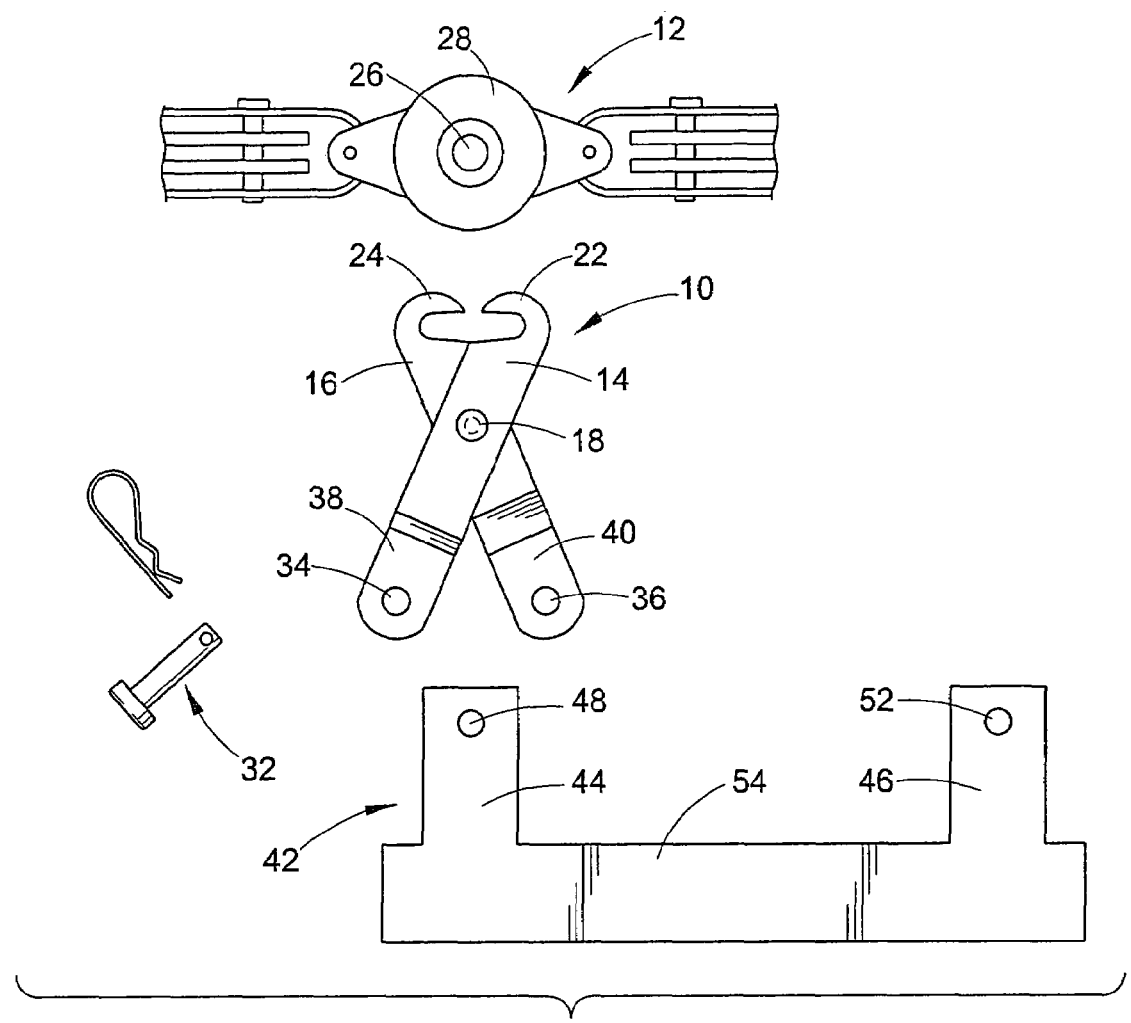
FIG. 1 is an elevational view of a known conveyor chain, clevis pendant and bar prior to attachment of the components.
Figure 2:
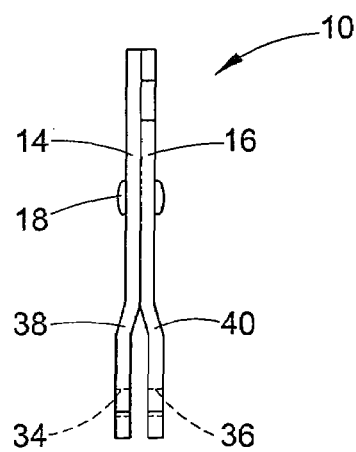
FIG. 2 is a side elevational view of the clevis pendant of FIG. 1.
Figure 4:
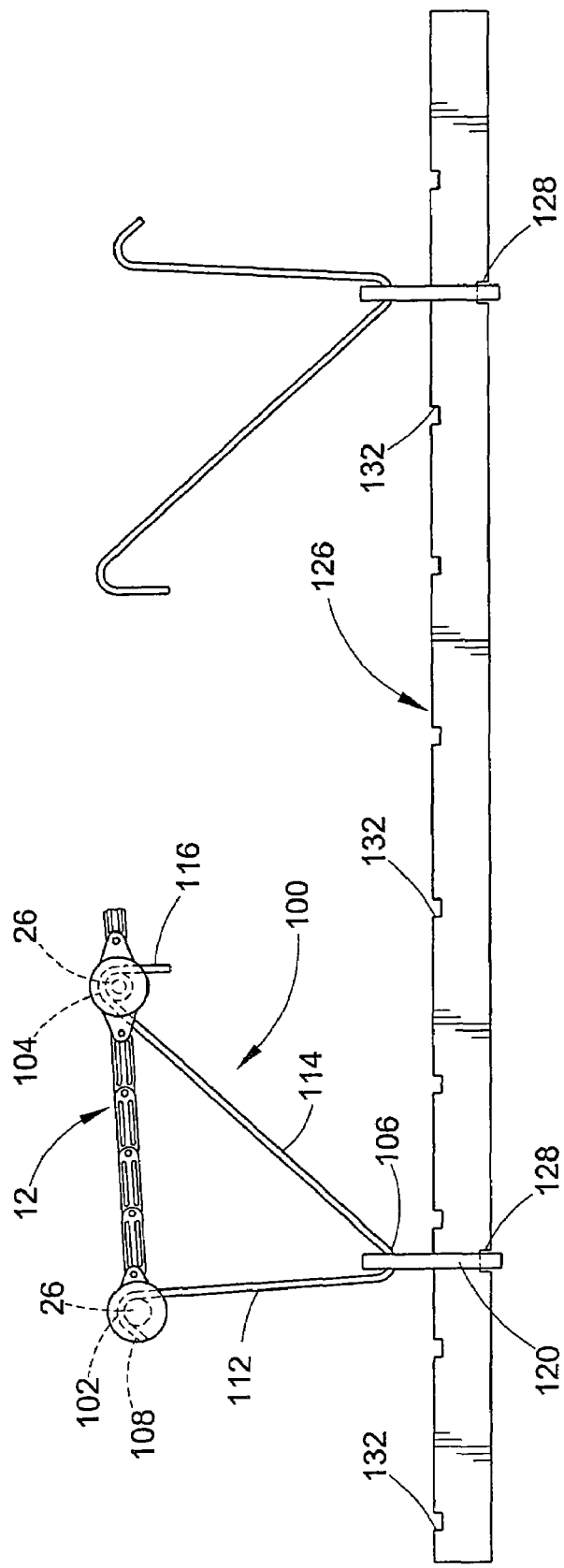
FIG. 4 is a side elevational view of the hanger assembly attached to a conveyor chain in accordance with the preferred embodiments of the present invention.

With reference now to FIG. 4, the hanger 100 attaches to a chain 12 by the first hooked portion 102 engaging a load pin similar to the load pin 26 shown in FIG. 1 and the second hooked portion 104 engaging another load pin 26 of the conveyor chain. Each hook shaped portion is curved to extend over the pins 26 and secure the hanger to the conveyor belt. The hanger is sufficiently flexible to allow the arms 112, 114 to bend toward or away from each other to allow the first and second portions to engage the lock pins.

Member 100 can be more particularly described as including a first end portion 108 that is adjacent the first hooked portion 102. A first arm 112 extends between the first hooked portion 102 and the curved portion 106. A second arm 114 extends from the curved portion 106 to the second hooked portion 104. A second end portion 116 extends away from the second hook portion 104. The first end portion 108 is shorter in length than the second end portion 116. Also, when hanging from a conveyor chain 12, as seen in FIG. 4, the first end portion 108 is positioned in a more horizontal direction as compared to the first end 116. Also in this embodiment, arm 114 has a greater length than the arm 112. Having one leg that is shorter than the other facilitates the process of attaching member 100 to the conveyor chain. Greater flexibility of the member 100 can be provided and passing one of the hooked portions over the load pin after the first has already been engaged is easier due to this configuration. However, other configurations can be also used. Because arm 114 is longer than arm 112, when member 100 is hung from the chain 12, arm 112 is more vertically oriented as compared to arm 114. This provides for a more stable assembly from which to hang items that are to be transported by the conveyor.

A load or support 120 hangs from member 100. With reference to FIG. 3, the load or support 120 includes an upper opening or aperture 122 that receives member 100 such that the load support bar 120 typically hangs from the curved portion 106 of member 100. Accordingly, member 100 can have a substantially uniform cross-sectional configuration along the length of the member. The load support bar 120 also includes a lower rectangular or elliptical shaped opening 124 that receives a load bar 126. The load bar also has a rectangular configuration such that it is received in the lower opening 124. Nevertheless, both the load bar 126 and the lower opening 124 can take alternative configurations. The bar 126 is slid through opening 124 of at least two load bar supports 120 that are typically spaced from one another.

With reference again to FIG. 4, the load bar 126 includes lower notches, which in this embodiment are two lower notches 128, that engage a portion of the load bar support 120. The load bar 126 can include a fewer or greater number of lower notches 128. The load bar also includes a plurality of upper notches 132 that are adapted to receive hooks much as the T-bar 54 of FIG. 1 does. Accordingly, a new hanger assembly will generally include two angled members 100 hanging from the conveyor chain 26. Each hanger assembly includes a member 100 having a load bar support 120 hanging on curved member 106 of member 100. Each load bar support includes an opening 124 to receive opposite ends of a load bar 126. Items can be hung from the load bar 126 and notches 132 are provided on the load bar to receive associated hooks.

A hanger assembly according to this embodiment requires less parts to attach to a conveyor chain as compared to known assemblies. Furthermore, the hanger assembly according to the present invention will not break away easily from the conveyor, has less waste and less replacement parts. Furthermore, the hanger assembly can be easily removed from the conveyor chain lessening the amount of downtime when replacing or repairing the hanger assembly. Furthermore, since the hanger assembly has less surface area than a conventional clevis pendant, less paint will accumulate on the hanger assembly further spacing apart the time between replacement or cleaning of each hanger assembly. The hanger assembly also minimizes failure of the conveyor system to carry articles, thus minimizing damage to the articles or injury to the system user.

A hanger assembly for an overhead conveyor system has been described in particular detail. Alternative embodiments will occur to other upon reading and understanding the preceding detailed description. It is intended that this disclosure include all such reasonable modifications and alterations.

The invention claimed is:

1. A hanger for an overhead conveyor system comprising a member including a first hook-shaped portion, a second hook-shaped portion spaced from the first hook-shaped portion the member further comprising an angled portion disposed between the first hook-shaped portion and the second hook-shaped portion, the angled portion being spaced from the first hook-shaped portion and the second hook-shaped portion along a line that is generally parallel to the first axis and along a second axis that is generally perpendicular to the first axis, the member further including a first arm interconnecting the first hook-shaped portion and the angled portion and a second arm interconnecting the second hook-shaped portion and the angled portion, and a load bar connected to the member, the load bar being adapted to allow associated items that are to be transported by the associated conveyor system to hang from the load bar.

2. The hanger of claim 1, wherein the member comprises a material that is sufficiently flexible to allow the first arm to bend towards the second arm about a point located in a region including or generally adjacent to the angled portion to facilitate engaging the first and second hook-shaped portions to the load pins of the associated conveyor chain.

3. The hanger of claim 1, wherein the first arm is shorter than the second arm.

4. The hanger of claim 1, wherein the member further comprises a first end portion integral with the first arm and extending away from the first hook-shaped portion and the first arm, and a second end portion integral with the second arm and extending away from the second hook-shaped portion and the second arm.

5. The hanger of claim 4, wherein the first end portion is shorter in length than the second end portion.

6. The hanger of claim 5, wherein the first end portion is closer to parallel with the first axis as compared to the second end portion relative to the first axis.

7. The hanger of claim 4, wherein the member has a substantially constant cross-sectional configuration between the first end portion and the angled portion.

8. A hanger assembly in combination with an overhead conveyor system, the assembly comprising:
- a generally V-shaped member adapted to attach to an overhead conveyor chain, the member including a first hook-shaped portion adjacent a first end of the member, a second hook-shaped portion adjacent a second end of the member, and a lower curved portion disposed between the first end and the second end, the second hook-shaped portion being spaced from the first hook-shaped portion generally along a first axis a distance that is generally equal to a distance between adjacent load pins of the overhead conveyor chain or a whole number multiple of the distance between adjacent load pins of the overhead conveyor chain; and
- a load bar connected to the member, the load bar being adapted to allow associated items that are to be transported by the overhead conveyor chain to hang from the load bar.

9. The assembly of claim 8, further comprising a support mounted to the member, the load bar being attached to the support.

10. The assembly of claim 9, wherein the support includes a first opening dimensioned to receive the member and a second opening dimensioned to receive the support.

11. The assembly of claim 10, wherein the member has a substantially constant cross-sectional configuration between the first end and the lower curved portion such that the support can be slid onto the member and reside at or adjacent the lower curved portion when the member is attached to the associated conveyor chain.

12. The assembly of claim 9, wherein the load bar includes at least one notch disposed on a lower edge of the load bar, the at least one notch being configured to receive at least a portion of the support.

13. The assembly of claim 8, wherein the load bar includes a plurality of notches disposed on an upper edge of the load bar, each of the notches being configured to receive hooks from which the associated items can be hung.

14. The assembly of claim 8, wherein the member includes a first arm interconnecting the first hook-shaped portion and the lower curved portion and a second arm interconnecting the second hook-shaped portion and the lower curved portion.

15. The assembly of claim 14, wherein the first arm is shorter than the second arm.

16. The assembly of claim 14, wherein the member is configured such that when attached to the overhead conveyor chain the first arm is more vertically oriented as compared to the second arm.

17. The assembly of claim 8, wherein the member comprises a first member and the assembly further comprising a second generally V-shaped member having at least substantially the same configuration as the first member, wherein the load bar connects to the first member and to the second member.

18. A hanger for an overhead conveyor comprising a generally V-shaped member adapted to attach to an associated overhead conveyor chain, the member including a first end portion, a first arm, a second end portion, a second arm, a first upper curved portion interposed between the first end portion and the first arm, a lower curved portion interposed between the first arm and the second arm, and a second upper curved portion interposed between the second arm and the second end portion, the member being configured such that the first curved portion and the second curved portion are concave toward the lower curved portion and the lower curved portion is concave toward the upper curved portions; and a load bar connected to the member being adapted to allow associated items that are to be transported by the associated conveyor system to hanci from the load bar.

19. The hanger of claim 18, wherein the first end portion is positioned closer to horizontal as compared to the second end portion when the member attaches to the associated overhead conveyor chain.

20. The hanger of claim 19, wherein the first end portion is shorter than the second end portion.

* * * * *